(12) United States Patent
Tantawi et al.

(10) Patent No.: US 8,230,107 B2
(45) Date of Patent: Jul. 24, 2012

(54) CONTROLLING WORKLOAD OF A COMPUTER SYSTEM THROUGH ONLY EXTERNAL MONITORING

(75) Inventors: Asser Nasreldin Tantawi, Somers, NY (US); Giovanni Pacifici, New York, NY (US); Wolfgang Segmuller, Valhalla, NY (US); Michael Joseph Spreitzer, Croton-On-Hudson, NY (US); Alaa Salah Youssef, Cairo (EG)

(73) Assignee: International Business Machines Corporation, Armonk, NY (US)

( * ) Notice: Subject to any disclaimer, the term of this patent is extended or adjusted under 35 U.S.C. 154(b) by 967 days.

(21) Appl. No.: 12/191,898

(22) Filed: Aug. 14, 2008

(65) Prior Publication Data

US 2008/0301696 A1  Dec. 4, 2008

(51) Int. Cl.
*G06F 15/16* (2006.01)
(52) U.S. Cl. ........................................ 709/235; 718/105
(58) Field of Classification Search .................. 709/235; 718/105
See application file for complete search history.

(56) References Cited

U.S. PATENT DOCUMENTS

| 6,067,412 A * | 5/2000 | Blake et al. ................... 718/102 |
| 2003/0187982 A1* | 10/2003 | Petit .............................. 709/225 |
| 2005/0102400 A1* | 5/2005 | Nakahara et al. ............. 709/225 |

* cited by examiner

*Primary Examiner* — Ryan Jakovac
(74) *Attorney, Agent, or Firm* — Michael J. Buchenhorner; Vazken Alexanian

(57) ABSTRACT

Provides control of the workload, flow control, and concurrency control of a computer system through the use of only external performance monitors. Data collected by external performance monitors are used to build a simple, black box model of the computer system, comprising two resources: a virtual bottleneck resource and a delay resource representing all non-bottleneck resources combined. The service times of the two resource types are two parameters of the black box model. The two parameters are evaluated based on historical data collected by the external performance monitors. The workload capacity that avoids saturation of the bottleneck resource is then determined and used as a control variable by a flow controller to limit the workload on the computer system. The workload may include a mix of traffic classes. In such a case, data is collected, parameters are evaluated and control variables are determined for each of the traffic classes.

11 Claims, 11 Drawing Sheets

$X_1, X_2$   Model parameters

CONTROLLING WORKLOAD OF A COMPUTER SYSTEM THROUGH ONLY EXTERNAL MONITORING

CROSS-REFERENCE TO RELATED APPLICATIONS

This application is cross-referenced and claims priority from Provisional Patent Application, assigned Application No. 60/702,309, filed Jul. 25, 2005, having the same title and inventors.

FIELD OF INVENTION

The invention relates to the control of the workload of a computer system through the use of only external performance monitors.

BACKGROUND FOR THE INVENTION

Large data processing systems, such as web serving systems, include of a multitude of hardware and software components that interact in a complex way. Such components include several tiers of execution units, web application environments, and databases. Performance modeling and evaluation includes building a queuing model of the computer system as a whole, characterizing the workload to the computer system, and analyzing the queuing model using a workload model to obtain performance measures. Modeling a computer system involves hardware components as well as software components. The hardware components include processing units (CPU), data storage units (RAM and disks), and communication channels. Such hardware components are resources shared by concurrent tasks executing in the system. When a task needs a resource that is not available, the task will wait in a queue until the resource becomes available. The interconnection of resources, along with their multiplicities, their capacities, and corresponding queuing disciplines form the basis for building a queuing model of the system hardware. In addition, there are software resources, such as threads of execution, database locks, and communication connections. Similar to hardware resources, tasks use software resources and queue for their usage if they are not available. Thus, there are queuing models of the system software. An overall system model combines both hardware and software components. The users of system resources, hardware or software, are tasks that get generated due to requests, as in an interactive workload, or due to job submissions, as in batch or long running workload. Different types of workload exhibit different behavior, as far as the amount of resources needed and the usage pattern of such resources are concerned.

There are several approaches to solving this problem. One approach is to employ a closed-loop feedback controller which adjusts its control variables in reaction to changes in the external observations, such as the average response time. There are several disadvantages to this approach, however. For example, it is oblivious to the system bottleneck and may drive the system into an undesirable, saturated state just to learn the effect of a given setting of the control variables. Another approach is to use an open-loop controller which uses a linear (or nonlinear) behavioral model for the computer system under control. The parameters of the model may be determined statically using off-line analysis, or dynamically using online measurements and analysis. One disadvantage of this approach is that the number of model parameters increases as an accurate model is sought, hence the parameter estimation problem becomes more complex. Further, the bottleneck resource is not represented explicitly in the model, and therefore it is not straightforward to determine the workload level that would not saturate the computer system.

In an environment such as the one described above, controlling the workload traffic, by limiting concurrency and/or throughput, becomes crucial in maintaining good system performance. Typically this control of workload is achieved through deploying monitoring agents on the various nodes to collect statistics related to the utilization of the various resources and the timing of requests as they receive their service. Such measured data is then used by an analyzer component to determine the bottleneck resource in the system. Then, a workload controller adjusts control variables such as concurrency and throughput limits. Thus, it is a requirement to have monitoring agents on the nodes, which are the controlled elements in this case. Such monitoring agents are software components that require a specific runtime environment, such as a specific level of an operating system or an application server. In a computer complex where nodes may be available from different vendors, it is not feasible to assume that the monitoring agents may be deployed on all nodes. Thus, one needs to have a solution for controlling the workload of nodes without relying on monitoring agents internal to the nodes, rather by just relying on external observations. The challenge is to identify the bottleneck resource inside a black box through only external observations.

SUMMARY OF THE INVENTION

The invention provides control of the workload of a computer system through the use of only external performance monitors. The data collected by the external performance monitors are used to build a simple, black box model of the computer system, comprising two resources: a virtual bottleneck resource and a delay resource representing all non-bottleneck resources combined. The service times of the two resources are parameters of the black box model. The two parameters are evaluated based on historical data collected by the external performance monitors. The workload capacity that avoids saturation of the bottleneck resource is then determined and used as a control variable by a flow controller to limit the workload on the computer system. The workload may include a mix of traffic classes. In such a case, data is collected, parameters are evaluated and control variables are determined for each of the traffic classes.

An example method of the invention for controlling the workload of an externally observable computer system, includes the steps of: observing external performance measures of requests in a common traffic class to said computer system, evaluating two parameters of a black box queuing model of said computer system, analyzing said black box queuing model, using said evaluated two parameters, to determine a desirable load capacity of said computer system, and employing said desirable load capacity as control parameters in a workload controller to said computer system.

The invention also provides flow control and concurrency control of a computer system through the use of only external performance monitors.

BRIEF DESCRIPTION OF THE DRAWINGS

The aspects, features and advantages of the present invention will be apparent to one skilled in the art, in view of the following detailed description taken in combination with the attached drawings, in which.

DESCRIPTION OF THE INVENTION

Figure 1:
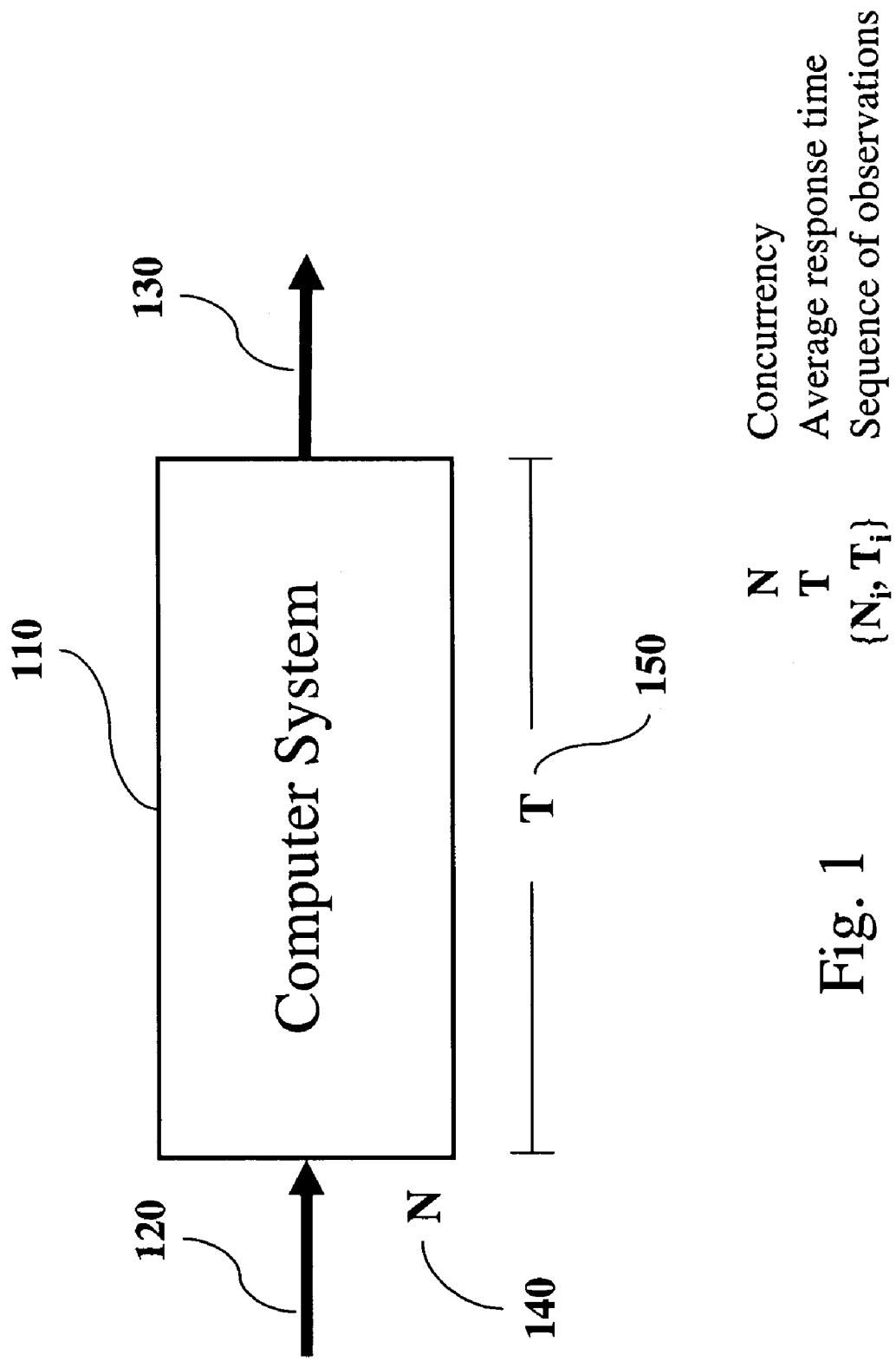
FIG. 1 illustrates an externally observable computer system.

The invention provides methods, apparatus and systems for the control of workload to a computer complex by relying only on external observations and building a simple, black box model. A novelty of the invention is in providing a solution for controlling the workload of a computer system without relying on monitoring agents internal to the computer system, rather by just relying on external observations. Further, a novelty of the invention is to capture the inaccessible, actual bottleneck resource in the computer system using a simple queuing network black box model with only two unknown parameters. Further, a novelty of the invention is to evaluate the two unknown parameters of the black box model using only external observations of the computer system. Moreover, a novelty of the invention is to employ the parameterized black box model to determine a desirable load to be used for workload control of the computer system.

The parameters of the black box model are evaluated based on the externally-observed measurements using a stochastic approximation technique. The black box model is then used to identify the bottleneck and obtain an optimal setting for the control parameters. The black box model is a queuing model which allows multiple classes of traffic in the workload and it includes only two parameters per traffic class. The model parameters are evaluated dynamically in an efficient stochastic search technique, as opposed to an exhaustive search. The derived black box model helps determine the optimal operating point, rather than incrementally moving the system in a given direction.

Description of the Environment

Consider a complex of one or more computing elements, possibly networked and/or arranged in a multi-tier topology. Each computing element represents a combination of hardware and software components, providing an environment for applications to run and hence rendering service to requests submitted by clients to the computer complex. In order to manage the performance of such a computer complex, the amount of workload admitted to the various computing elements is controlled. Such a control may be achieved by limiting traffic flow rates or concurrency of requests. A workload controller may be controlling a collection of one or more interconnected computing elements. We refer to this collection as the controlled computer system, or simply computer system. A computer system is thus a controlled element.

There may be several workload controllers, each controlling a computer system. We limit our discussion to a single workload controller and a single controlled computer system.

The workload to a computer system is described as a set of request streams (or traffic classes) submitted by clients, external and/or internal to the computer complex. Requests in the same stream are similar and are said to belong to a common traffic class. The similarity of requests in a common traffic class includes (1) requesting a common service, thus having common resource needs, (2) having similar load characteristics, such as arrival pattern and service requirements, and (3) belonging to a particular service class with some common quality of service guarantee. Once submitted to a computer system, a request from a common traffic class uses the various hardware and software resources in the computer system until it is serviced and a response is sent back to the client. During the lifetime of a request in a computer system, the request spends time on the various resources when using them, as well as time awaiting their use if used by other requests in the computer system. The resource with the highest utilization is called the bottleneck resource. The perceived computer system performance, say measured as the average request response time, depends on the utilization of the bottleneck resource. Beyond a certain value of the utilization of the bottleneck resource, the computer system becomes saturated and its perceived performance degrades. A well-managed computer system uses a workload controller to limit the workload so as to avoid saturation. Two possible mechanisms to limit the workload are: rate control and concurrency control. In the rate control mechanism, the number of requests per second is limited. Whereas, in the concurrency control mechanism, the number of concurrent requests in the computer system is limited. The basic difference between the two mechanisms, as far as modeling is concerned, is that an open (closed) model is used for the rate (concurrency) control mechanism. Further, the control variable is flow rate (concurrency limit) in the rate (concurrency) control mechanism Without loss of generality, we limit the discussion to the concurrency control mechanism, and hence closed model. The rate control mechanism may be dealt with in a similar fashion, except by solving an open rather than a closed model.

Description of the Black Box Model

Figure 2:
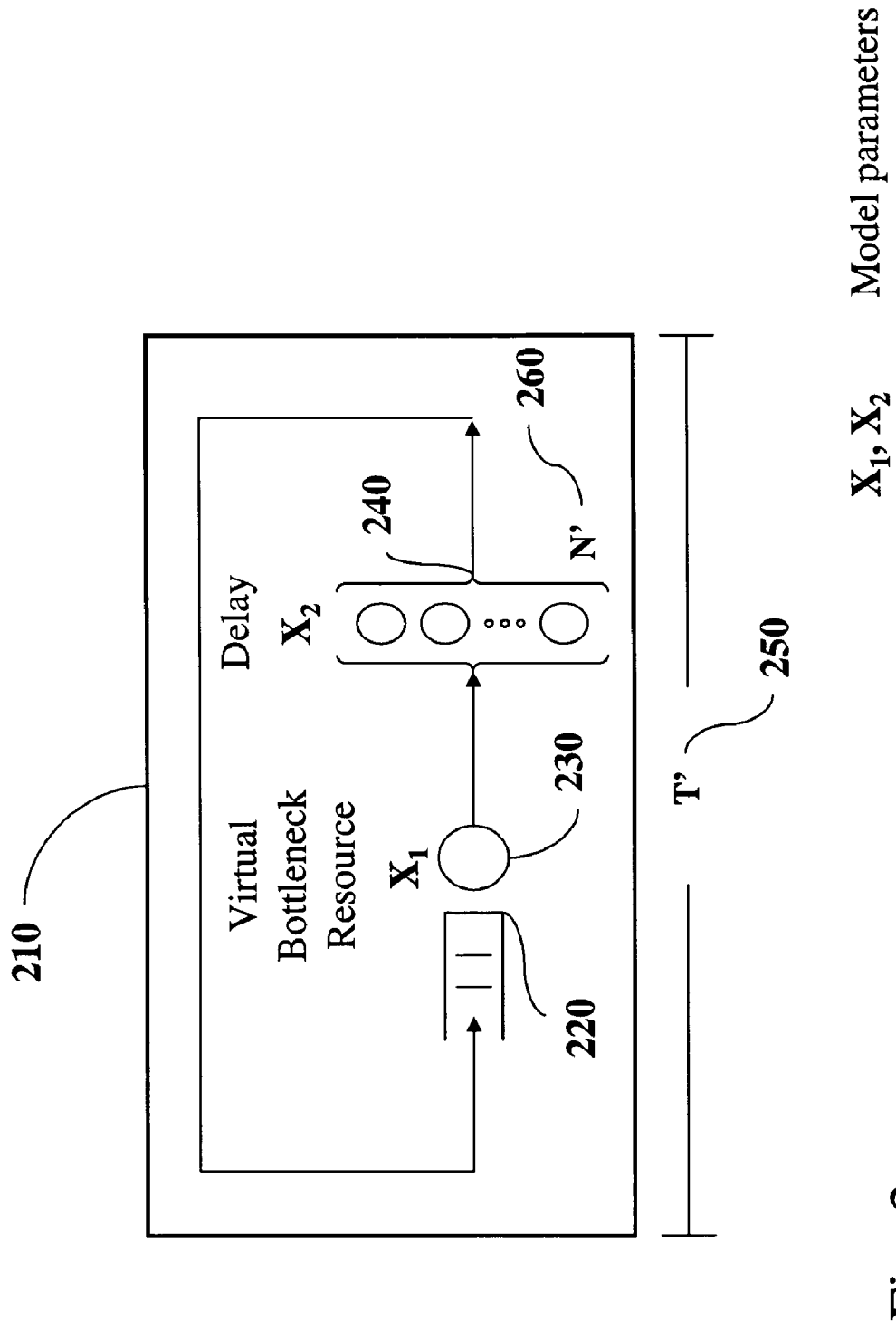
FIG. 2 illustrates a black box model of a computer system.

An externally observable computer system is depicted in FIG. 1. Requests 120 are submitted to the computer system 110 and responses 130 are sent by the computer system. The number of concurrent requests 140 is denoted by N. And, the average response time 150 of a request is denoted by T. The externally observable computer system is modeled by an equivalent black box model represented by a machine repairman queuing model as depicted in FIG. 2. The equivalent model 210 is a machine repairman model (also known as a central server model). The number of machines 260, denoted by N', Machines represent concurrently executing requests, and the repairman represents the virtual bottleneck single resource 230 with waiting room 220. The single resource 230 is referred to as virtual bottleneck since it represents the actual bottleneck resource in the actual computer system 110. This follows from the fact that computer system 110 is only externally observable, hence the actual bottleneck resource is unknown and inaccessible. All other resources are aggregated into delay 240, representing the machine up time, X2. The repair time, X1, represents the time a request spends on the bottleneck resource. Two external observations are collected: concurrency 260 and response time 250. Each request is classified to one of multiple classes. Thus, all symbols represent vectors with the number of classes as its length.

We base our reasoning for the development of this two-parameter black box model on two findings: collapsing single-server stations in a tandem of queues and approximating a multiserver queue by a single server queue. The first finding establishes that in a sequence of single-server stations with an arbitrary arrival process, constant service times at all servers, and FIFO discipline, the time spent in the system by each job is independent of the order of the stations. Moreover, this time is equal to the sum of the service times plus the time that the same job would wait in a queue at a single-station system with the station of the longest service and the same arrival process. The second finding states that a M-server queue with service time S is approximated by a sequence of a single-server queue with service time S/M and a delay queue with service time (S−S/M).

Description of a Method

Figure 3:
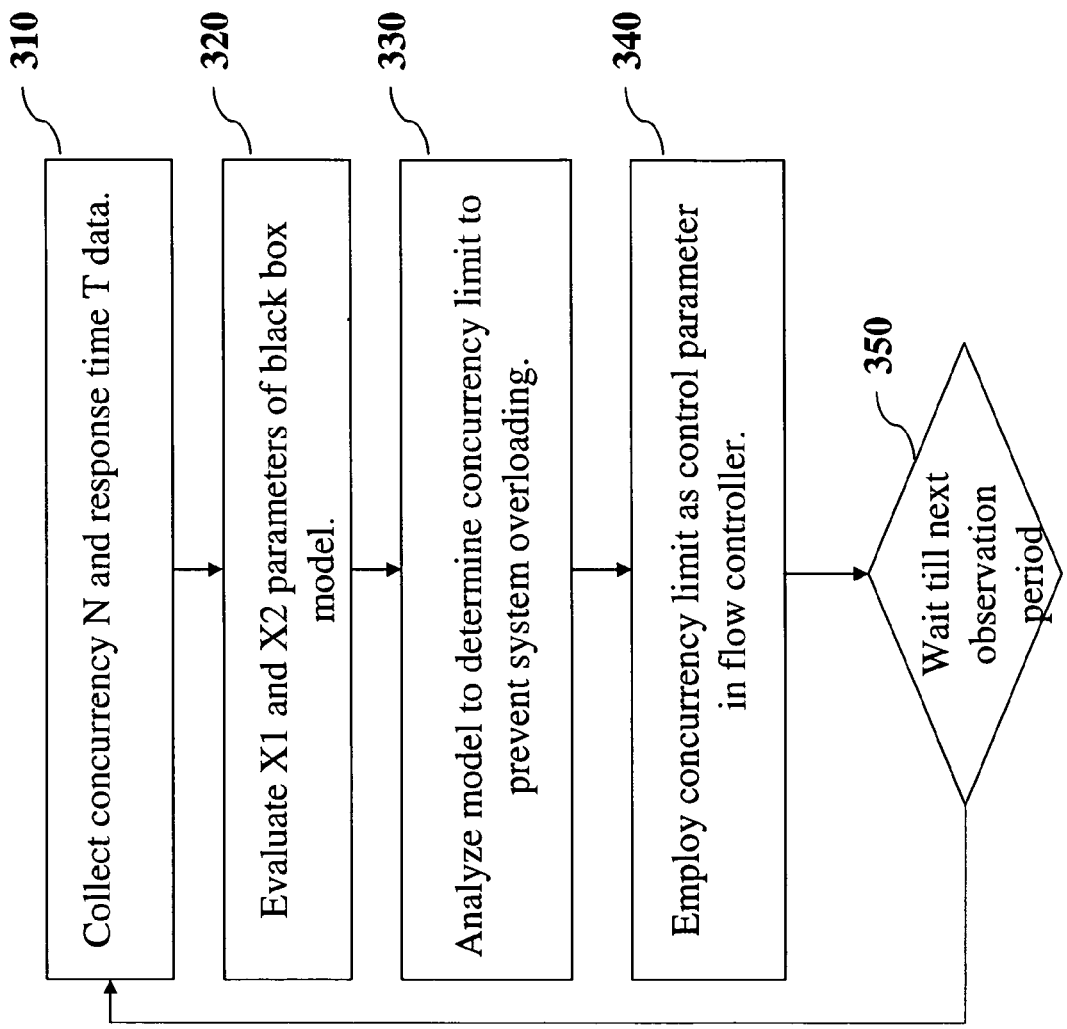
FIG. 3 illustrates a method of the invention having four steps executed periodically.

A method includes four steps executed periodically 350 as depicted in FIG. 3. The period depends on the availability of the external performance data and the cost of computation of the method. A typical period for computer systems vary between a few seconds to a few hours.

1. Observing 310 external performance measures of requests by collecting concurrency measures N and response time measures T.
2. Evaluating 320 two parameters of a black box queuing model; the service time of a virtual bottleneck resource X1, and the service time on resources other than the virtual bottleneck resource X2.
3. Analyzing 330 the black box queuing model to determine a desirable load capacity that would drive the utilization of the virtual bottleneck resource to a pre-specified, desirable value.
4. Employing 340 the desirable load capacity as control parameters in a workload controller by determining a concurrency limit based on the computed load capacity.

Now, we elaborate on each of the steps described above.

External Observation

We collect two external observation measures: the concurrency limit (N and the corresponding average response time (T). Let the sequence of observations be $\{(N_i, T_i); i=1, \ldots, H\}$, where $H \geq 1$ is the number of historical observations used in the parameter estimation process.

Parameter Evaluation

The present invention formulates the modeling problem to be one of two unknown parameters. This is in counter distinction to prior art that had many parameters. These two unknown parameters to the black box model are: the service time of the virtual bottleneck resource (X1) and the delay accounting for all other non-bottleneck resources (X2). Each pair of unknown parameters relate to a particular traffic class. For multiple traffic classes, there will be a pair of unknown parameters per traffic class. Let N' and T' be the concurrency and the computed mean response time from the black box model given X1 and X2. The values of X1 and X2 are evaluated in such a way that the difference (or error) between (N', T') and (N, T) is minimal. The main idea is to search for a pair of values, X1 and X2, in such a way that the response time obtained using the black box model, employing the pair X1 and X2 as parameter values, is close as much as possible to the observed response time measurements. Thus, the goal is to determine the two parameter values through matching the response times of the black box model and the observed response time measures. The deviation between the response time obtained from the black box model and the observed response time measurements is captured by an error called the estimation error. The estimation error is defined as follows. Let $\{T'_i; i=1, \ldots, H\}$ be the sequence of H response times obtained using the black box model corresponding to $\{T_i; i=1, \ldots, H\}$, the sequence of response time observations over the same H sample points. Then, the sum of $(T'_i - T_i)^2$ over $i=1, \ldots, H$, divided by H yields the average square error. The estimation error is defined as the squared root of the average square error. For multiple traffic classes, the squared root of the average square error of each of the classes are added, then divided by the number of traffic classes, yielding an estimation error quantity.

Several known techniques for minimizing the error may be used. We preferred a stochastic approximation technique, SPSA (Simultaneous Perturbation Stochastic Approximation), that searches the (X1, X2) space in random directions. The SPSA technique is well known in the art. There are several advantages to this SPSA technique. First, it deals with noisy measurements. Second, it has a stochastic component, hence it has the tendency to jump to a neighborhood of the solution faster than other deterministic techniques. Third, its complexity improves relative to other techniques in the case of multiple (K) classes of traffic, where both X1 and X2 are vectors of length K each, hence the total number of variables is 2K. Fourth, a mathematical model of the system to be optimized is not needed.

Analyzing the Equivalent Queuing Model

Once the parameters X1 and X2, as well as the concurrency limit N', are specified, the equivalent model illustrated in FIG. 2 is solved using prior art queuing analytic techniques. A common technique to obtain the average response time T' is MVA (Mean Value Analysis).

Optimal Workload

Once the model parameters are evaluated, we use the black box model to obtain an optimal value for the concurrency limit, N*, that drives the utilization of the virtual bottleneck resource to a prespecified and desirable target level, R*. Typically, the perceived computer system performance, say measured as the average request response time, depends on the utilization of the bottleneck resource. Beyond a certain value of the utilization of the bottleneck resource, the computer system becomes saturated and its perceived performance degrades. A well-managed computer system uses a workload controller to limit the workload so as to avoid saturation. A desirable target utilization of the virtual bottleneck resource is one that is large in order to improve system utilization and throughput, yet not too large so as to avoid saturation and degraded performance. A value between 0.9 and 0.95 is preferred, but any value may be used subject to system administrator decision.

There are several techniques that one could use to obtain N*. We use the MVA (Mean Value Analysis) technique for solving closed queuing networks since the technique is incremental in N, and therefore no search for N* is necessary. As N is incremented, we compare the corresponding utilization of the (virtual) bottleneck resource R with the prespecified value R*. We stop the MVA algorithm once R* is reached. The corresponding value of concurrency is then used as N*. In the case of an open model, the optimal traffic rate is simply obtained by dividing the prespecified utilization value R* by the service time X1.

Multiple Traffic Classes

Extension to the case of multiple traffic classes is straightforward. Typically, requests may have different characteristics, as far as the workload arrival pattern and the resources needs are concerned. Requests of similar characteristics are grouped into a common traffic classes. Let us assume that we have K>1 distinct traffic classes. The parameters of the equivalent model illustrated in FIG. 2 become X1(k) and X2(k), for class $k=1, 2, \ldots, K$, respectively. Further, the concurrency and response time become N'(k) and T'(k), for class k=1, 2, ..., K, respectively. The steps of the method illustrated in FIG. 3 remain the same, except that the quantities N and T in step 310 become vectors of length K, the quantities X1 and X2 in step 320 become vectors of length K, as well as the concurrency limits alluded to in steps 330 and 340. Analyzing the equivalent queuing model is still performed using a multiclass MVA (Mean Value Analysis) technique.

Description of the Apparatus

Figure 4:
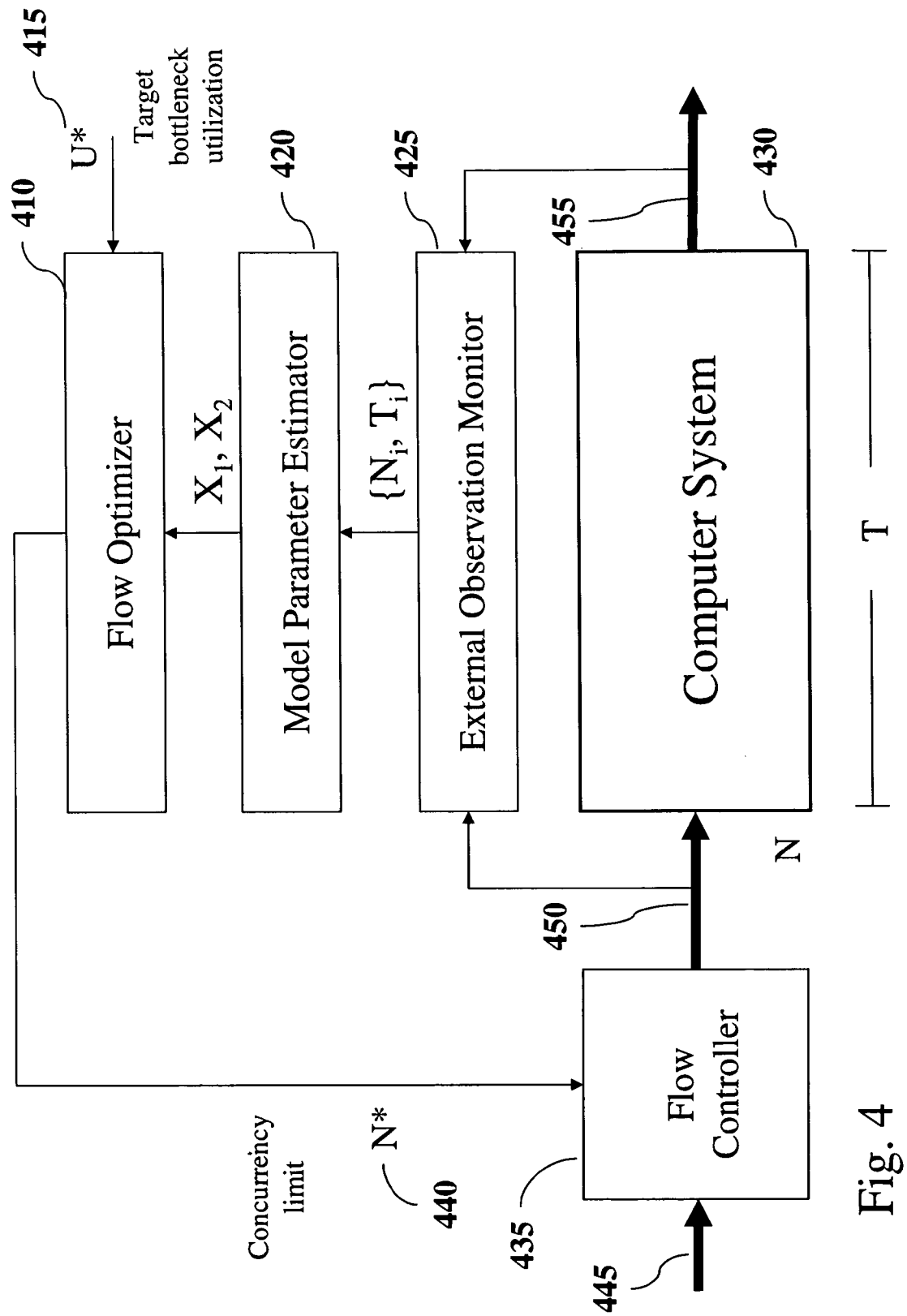
FIG. 4 illustrates various components of a system of the invention.

The system includes various components as depicted in FIG. 4. The External Observation Monitor 425 correlates requests (in) 450 and responses (out) 455 from the computer system 430 and gathers statistics about the concurrency and response times of the various classes. The sequence of observations is used by the Model Parameter Estimator 420 to evaluate the two parameters: X1 and X2, for all traffic classes. Parameter evaluation is conducted using a Simultaneous Perturbation Stochastic Approximation technique. Then the Flow Optimizer 410 uses the black box, multi-class machine repairman model with parameters X1 and X2, to compute an optimal concurrency N* 440 which should use the bottleneck resources up to a target utilization U* 415. The Flow Controller 435 controls the offered load 445 by using the computed optimal N* 440 to set its control variables in order to achieve the optimal operating point.

Demonstration of the Invention

Figure 5:
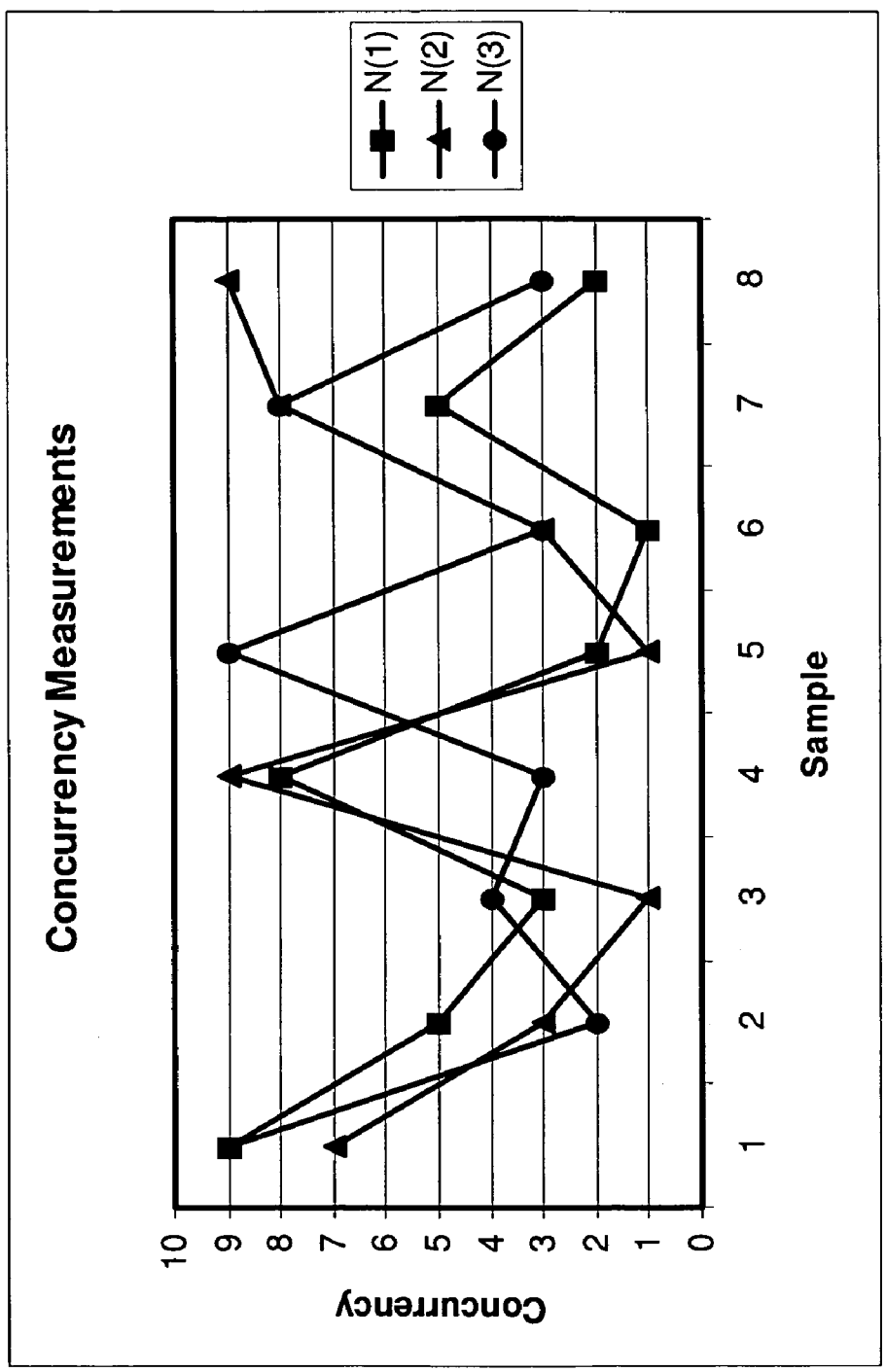
FIG. 5 illustrates samples of concurrency measurements.
Figure 6:
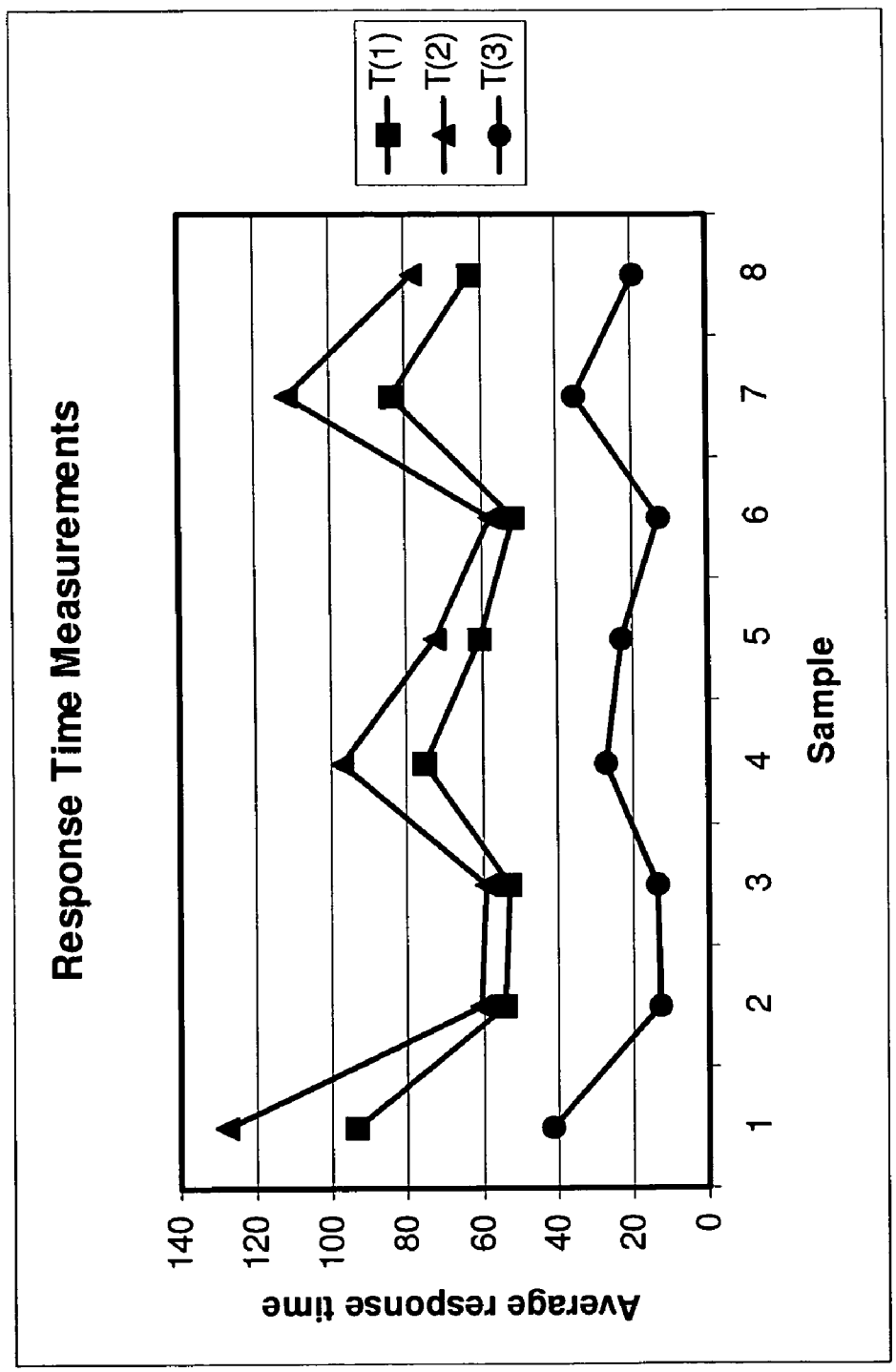
FIG. 6 illustrates samples of response time measurements.

A demonstration of the method of the present invention follows. The demonstration environment consists of a simulator of a computer system presented with three traffic classes. Each traffic class is unique in its resource needs and resource service requirements. Through the external observation of the simulated computer system, two performance measures are collected for each of the three traffic classes: concurrency and response time. The data is collected periodically for eight consecutive intervals, resulting in a series of eight samples. The concurrency measurements are depicted in FIG. 5. The symbols N(1), N(2), and N(3), represent concurrency, i.e. the number of concurrent executing requests in the computer system, from traffic classes 1, 2, and 3, respectively. The variation depicted in FIG. 5 in concurrency over the various samples is due to load changes from the three traffic classes. The response time measurements are depicted in FIG. 6. The symbols T(1), T(2), and T(3), represent response time, i.e. the average elapsed time between a request arriving to the computer system and the request being serviced and a response is generated, from traffic classes 1, 2, and 3, respectively. The values are expressed in units of time. The variation depicted in FIG. 6 in response time over the various samples is due to contention on the various resources in the computer system as a result of the load imposed by the three traffic classes.

Figure 7:
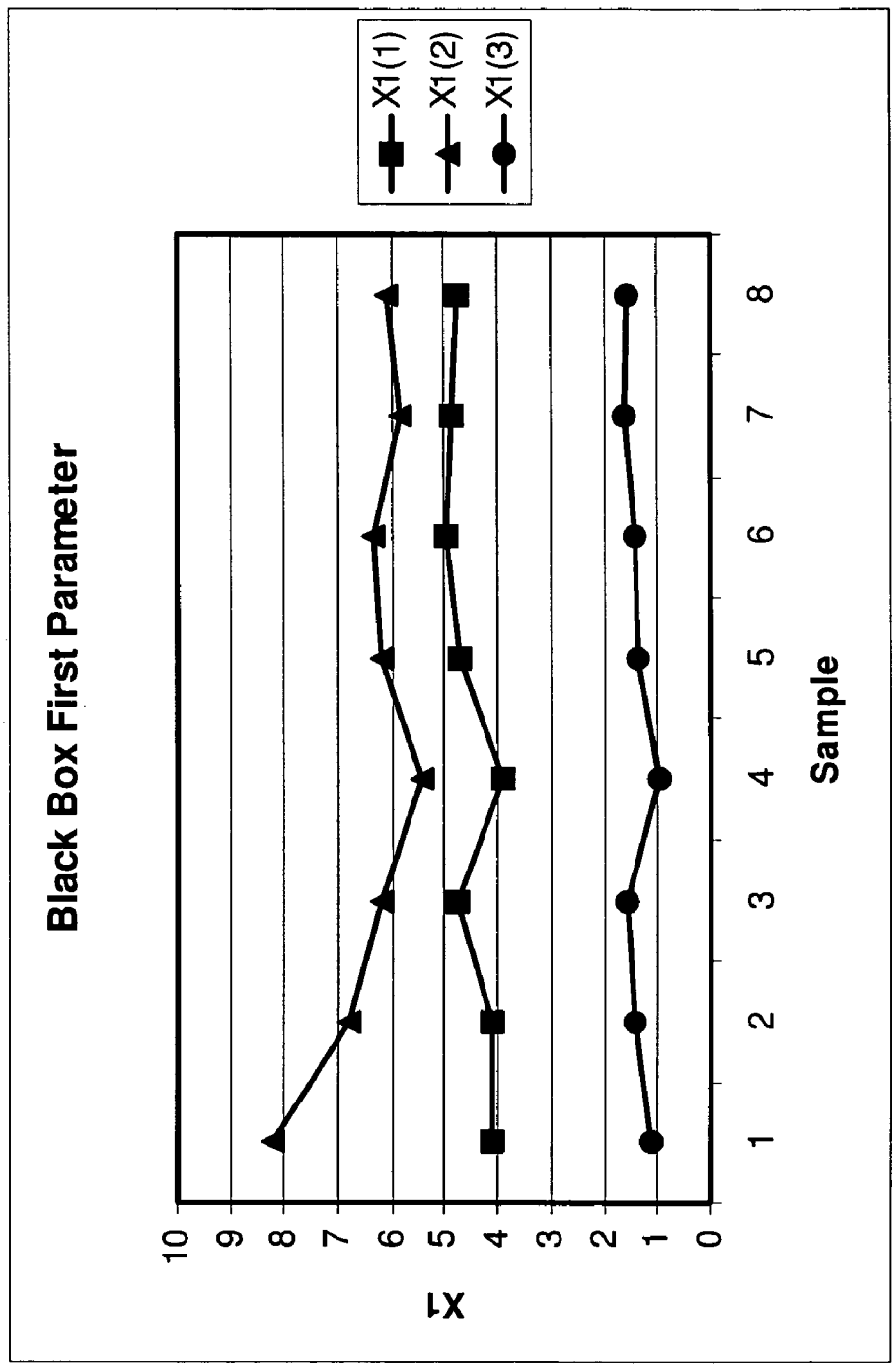
FIG. 7 illustrates obtained black box first parameter from samples.
Figure 8:
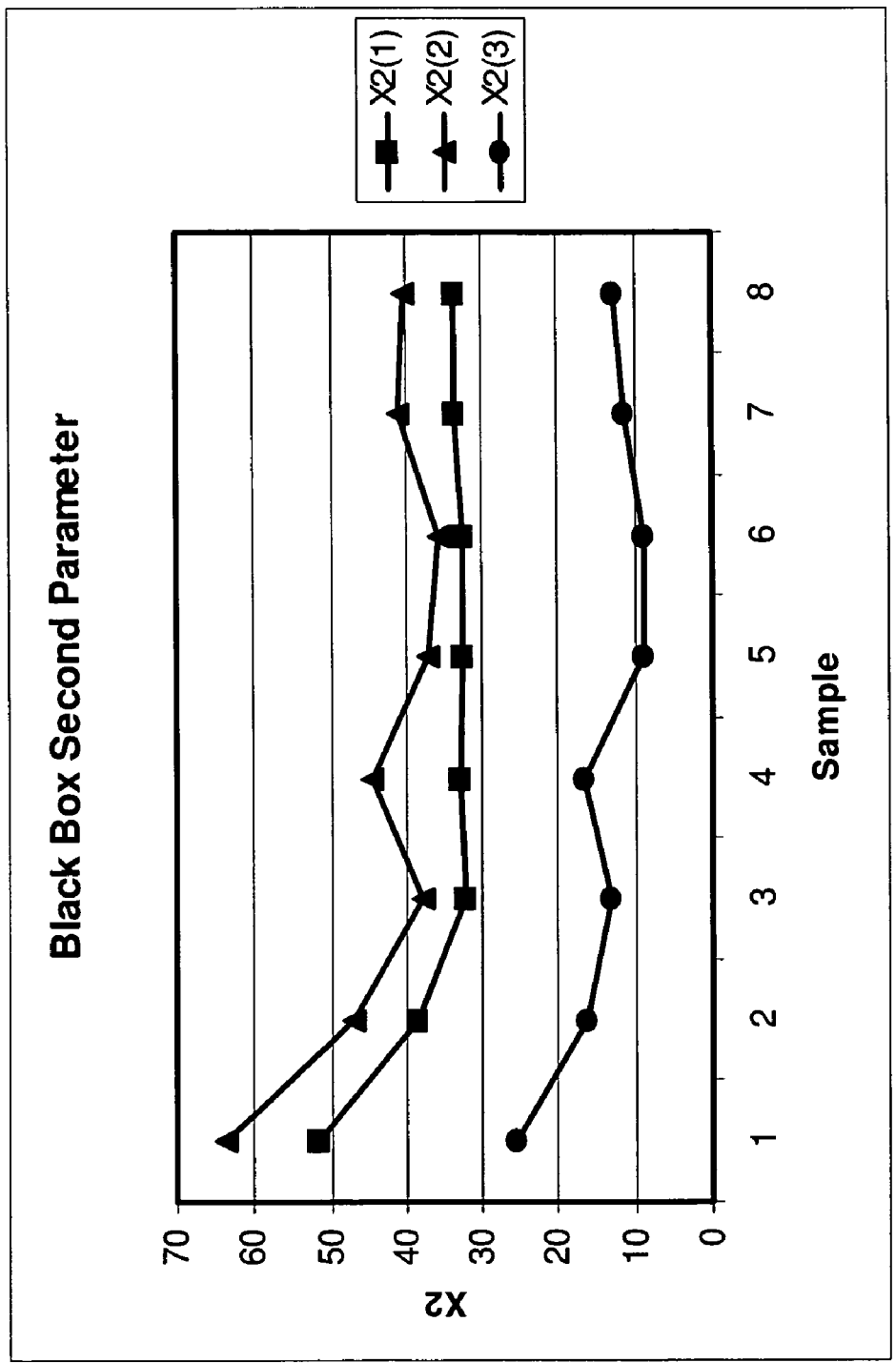
FIG. 8 illustrates obtained black box second parameter from samples.
Figure 9:
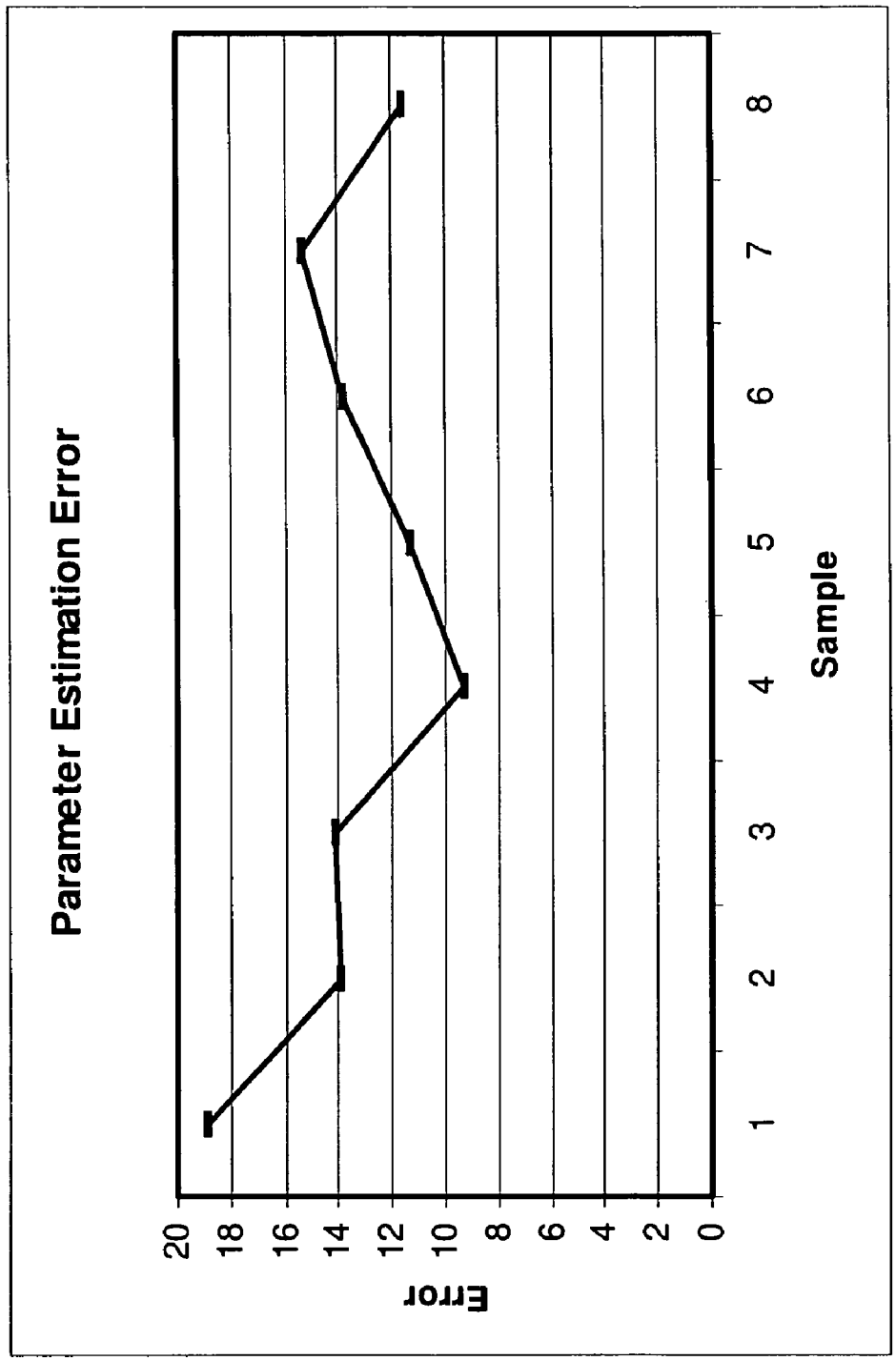
FIG. 9 illustrates the error in estimating black box two parameters from samples.
Figure 10:
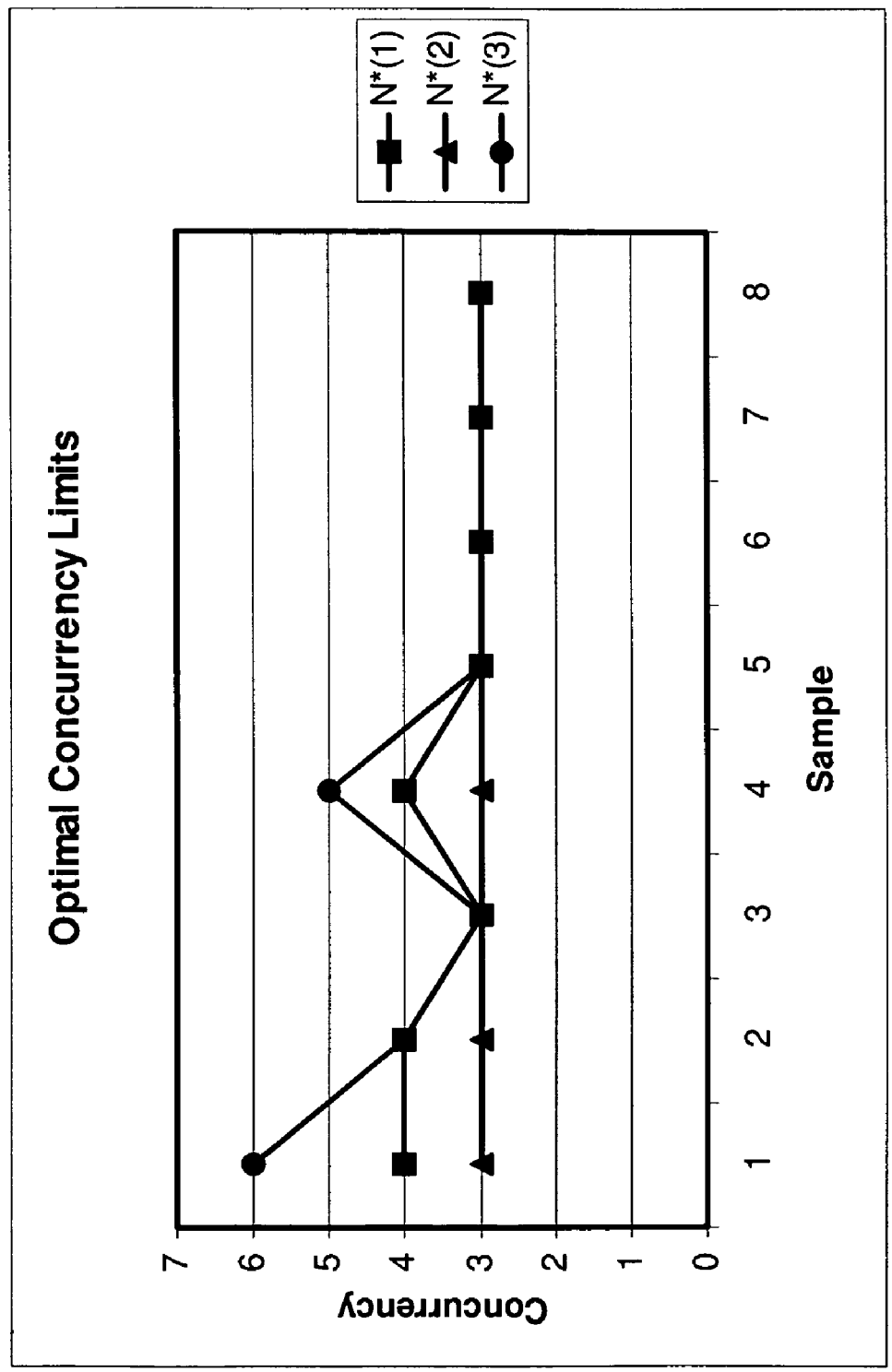
FIG. 10 illustrates determined concurrency limits from analyzing black box model with obtained two parameters.
Figure 11:
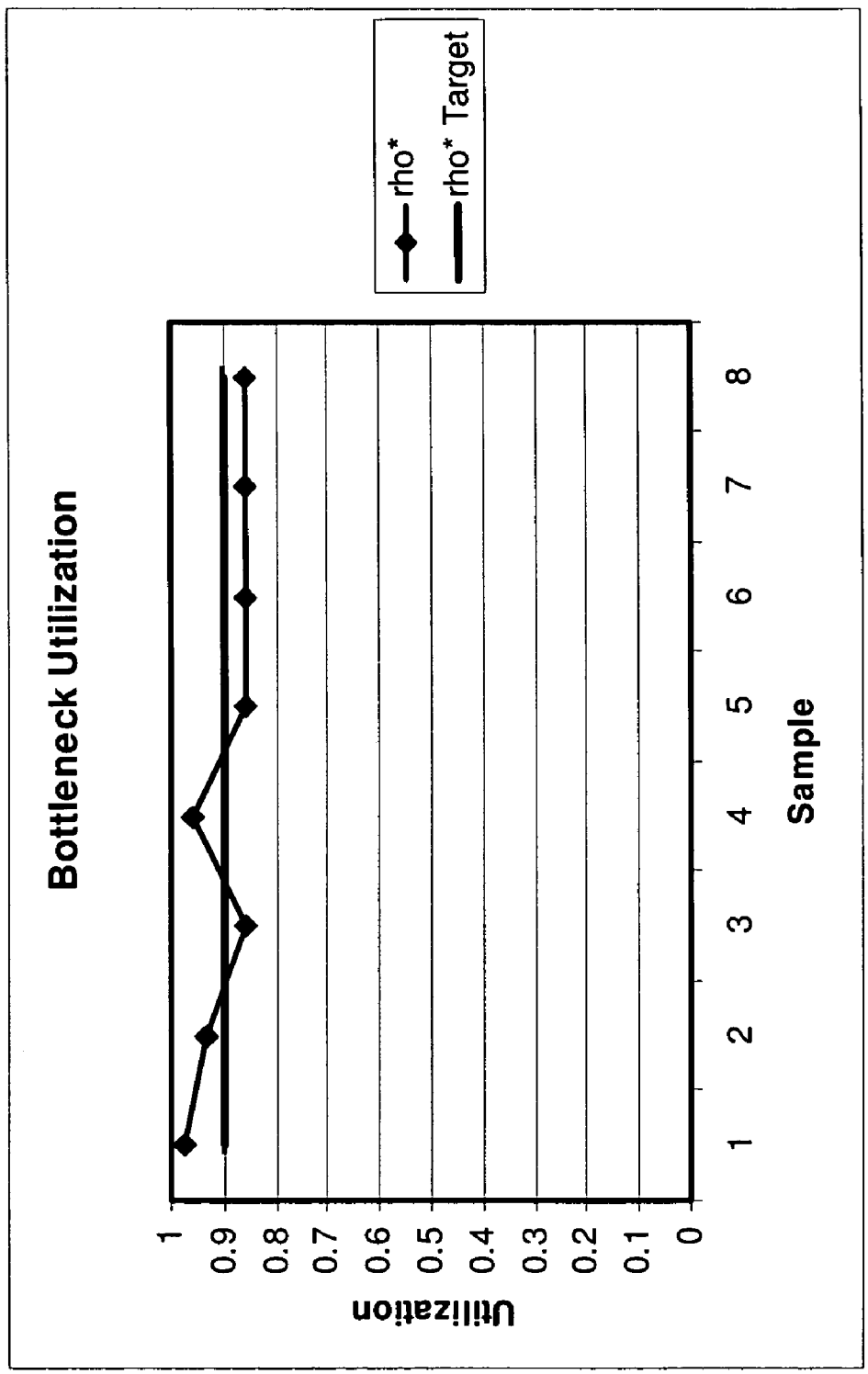
FIG. 11 illustrates the achieved virtual bottleneck utilization using determined concurrency limits compared to a target virtual bottleneck utilization.

The SPSA technique is used to evaluate the two parameters of the black box model: the service time of the virtual bottleneck resource (X1) and the delay accounting for all other non-bottleneck resources (X2). There are three pairs of parameters, (X1(1), X2(1)), (X1(2), X2(2)), (X1(3), X2(3)), one pair for each of the three traffic classes 1, 2, and 3, respectively. The evaluation of the first of the two pair of parameters, X1, is depicted in FIG. 7. As shown, the values of X1(1), X1(2), and X1(3) improve as more samples become available. In this demonstration, the last four samples are used in the evaluation step, i.e. H=4. The values of the first parameter of the black box model converge to X1(1)=4.8, X1(2)=6.1, and X1(3)=1.6 units of time. Similarly, the evaluation of the second of the two pair of parameters, X2, is depicted in FIG. 8. As shown, the values of X2(1), X2(2) and X2(3) improve as more samples become available. The values of the second parameter of the black box model converge to X2(1)=33.5, X2(2)=40.2, and X2(3)=12.9 units of time. The magnitude of the estimation error in evaluating the two parameters of the black box model is depicted in FIG. 9. The estimation error decreases as more samples become available. It is well known that increasing the value of H, the number of samples used, would decrease the magnitude of the estimation error. Further, variations in the sample data would help in decreasing the magnitude of the estimation error. Based on the evaluated two parameters of the black box model, the model is solved using the MVA technique to determine the concurrency limits, N*(1), N*(2), and N*(3), for the three classes that drives the utilization of the virtual bottleneck resource to a desired target value. In the demonstration, the desired utilization value is 0.9, i.e. 90 percent of the time the virtual bottleneck resource is utilized. The values of the determined concurrency limits, N*(1), N*(2), and N*(3), are depicted in FIG. 10. The values converge to the concurrency limits: N*(1)=N*(2)=N*(3)=3. Employing the determined concurrency limits N*(1), N*(2), and N*(3) for controlling the workload of the computer system results in the virtual resource utilization depicted in FIG. 11. It is noted that the achieved virtual resource utilization, using the determined concurrency limits, is close to the desired value, 0.90, of the virtual resource utilization. The achieved virtual resource utilization converged to about 0.86.

The invention includes a system for workload control. In some embodiments, the system for workload control includes: an external observation monitor to keep track of concurrent requests and response time of the requests as the requests enter a computer system, and to keep track of corresponding responses to the requests as the responses leave the computer system; a model parameter estimator to use historical observations from the external observation monitor to evaluate two unknown parameters of the black box queuing model, the two unknown parameters being: a service time of the requests on a virtual bottleneck resource, and a service time of the requests on other resources, a flow optimizer to analyze the black box queuing model using the evaluated two parameters and computes concurrency limit that achieves a desirable utilization of the virtual bottleneck resource, and a how controller to use the computed concurrency limit as a control parameter to limit a number of outstanding requests to the computer system.

In some embodiments of the system the external observation monitor, the model parameter estimator, the flow optimizer, and the flow controller each performing their respective function for other requests for other traffic classes and/or at a predetermined periodic rate.

The invention includes a method for concurrency control. In some embodiments, the method for concurrency control includes preventing overload of resources within a computer system. The step of preventing includes the steps of: collecting average response time data and concurrency data of requests in a common traffic class, of the computer system; employing the average response time data and the concurrency data for evaluating two parameters of a model of the computer system, the two parameters being: a service time of said requests on a virtual bottleneck resource, and a service time of said requests on other resources; analyzing said model for determining a target concurrency of said requests on said computer system which drives a utilization of a bottleneck resource on said computer system to a prespecified value; and employing said target concurrency for limiting admission of additional requests to said computer system. Limiting admission involves keeping track of the number of concurrently executing requests in the computer system and making sure that that number does not exceed the determined target concurrency.

The invention also includes a method for flow control. In some embodiments, the method for flow control includes preventing overload of resources within a computer system. The step of preventing including the steps of: collecting average response time data and concurrency data of requests in a common traffic class, of said computer system; employing said average response time data and concurrency data for evaluating two parameters of a model of said computer system, said two parameters being: a service time of said requests on a virtual bottleneck resource, and a service time of said requests on other resources; analyzing said model for determining a target flow rate of said requests on said computer system which drives a utilization of a bottleneck resource on said computer system to a prespecified value; and employing said target flow rate for limiting flow of said requests to said computer system. Limiting flow involves keeping track of the flow rate, computed as requests arriving to the computer system per unit time, and making sure that the computed flow rate does not exceed the determined target flow rate, computed as the throughput that cause the utilization of the virtual bottleneck resource to reach the prespecified value. In some embodiments of the method for concurrency and/or flow control the prespecified value prevents overloading of said computer system.

The invention also includes a system for concurrency control. In some embodiments, the system for concurrency control includes: means for preventing overload of resources within a computer system, the means for preventing comprising: means for collecting average response time data and concurrency data of requests in a common traffic class, of said computer system; means for employing said average response time data and said concurrency data for evaluating two parameters of a model of said computer system, said two parameters being: a service time of said requests on a virtual bottleneck resource, and a service time of said requests on other resources; means for analyzing said model for determining a target concurrency of said requests on said computer system to drive a utilization of a bottleneck resource on said computer system to a prespecified value; and means for employing said target concurrency for limiting admission of additional requests to said computer system. The means for employing the determined target concurrency works as a concurrency limiter by keeping track of the number of concurrently executing requests in the computer system and making sure that that number does not exceed the determined target concurrency.

The invention also includes a system for flow control. In some embodiments, the system for flow control includes: means for preventing overload of resources within a computer system, the means for preventing comprising: means for collecting average response time data and concurrency data of requests in a common traffic class, of said computer system; means for employing said average response time data and concurrency data for evaluating two parameters of a model of said computer system, said two parameters being: a service time of said requests on a virtual bottleneck resource, and a service time of said requests on other resources; means for analyzing said model for determining a target flow rate of said requests on said computer system which drives a utilization of a bottleneck resource on said computer system to a desirable prespecified value; and means for employing said target flow rate for limiting the flow of said requests to said computer system. The means for employing the determined target flow rate works as a flow limiter by keeping track of the flow rate, computed as requests arriving to the computer system per unit time, and making sure that the computed flow rate does not exceed the determined target flow rate.

It is noted that steps from the method for workload control are applicable to the methods of flow and concurrency control and vice versa. Similarly, components from the system for workload control are applicable to the systems of flow and concurrency control and vice versa.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A method for workload control, comprising:
controlling workload of an externally observable computer system, said step of controlling comprising:
using external performance monitors collecting data by observing only external performance measures of a plurality of requests in a common traffic class directed to the computer system, wherein said external performance measures are: a concurrency measure and a corresponding average response time of the plurality of requests in the common traffic class;
using the collected data to build a black box queuing model of said computer system, said black box queuing model comprising only two resources:
a virtual bottleneck resource; and
a delay resource representing all non-bottleneck resources combined;
operating the black box queuing model with only two parameters related to the common traffic class:
a service time of the requests on a virtual bottleneck resource, and
a delay accounting of the requests on non-bottleneck resources,
wherein the two parameters are evaluated based on historical data collected by external performance monitors;
using said evaluated two parameters for analyzing said black box queuing model to determine a desirable load capacity of said computer system, said desirable load capacity being the one that drives utilization of the virtual bottleneck resource to a prespecified and desirable target level;
using the desirable load capacity to determine a concurrency limit that drives the utilization of the virtual bottleneck resource based on the computed load capacity; and
employing said desirable load capacity as control parameters for controlling workload of said computer system.

2. The method for workload control as recited in claim 1, wherein the step of employing comprises determining a concurrency limit of said requests based on said computed load capacity to control flow of said requests to said computer system.

3. A method for workload control as recited in claim 1, further comprising repeating the steps of:
observing;
using said external performance measures for evaluating;
using said evaluated two parameters for analyzing; and
employing for requests from at least one other traffic class.

4. A method for workload control as recited in claim 1, further comprising repeating the steps of:
observing;
using said external performance measures for evaluating;
using said evaluated two parameters for analyzing; and
employing at a predetermined periodic rate.

5. The method for workload control as recited in claim 1, wherein the step of observing comprises collecting concurrency measures and response time measures of said requests;
wherein the step of using said external performance measures comprises determining said two parameters of said black box queuing model by matching concurrency measures and response time measures computed using said black box model to said collected concurrency measures and response time measures of said requests;
wherein the step of using said evaluated two parameters for analyzing comprises solving said two parameter queuing model and computing load capacity that drives utilization of said virtual bottleneck resource to a prespecified value; and
wherein the step of employing comprises determining a concurrency limit of said requests based on said computed load capacity to control flow of said requests to said computer system, and further comprising repeating the steps of:
observing;
using said external performance measures for evaluating;
using said evaluated two parameters for analyzing; and
employing for requests from at least one other traffic class.

6. An article of manufacture comprising a non-transitory computer storage medium having computer readable program code means embodied therein for causing workload control, the computer readable program code means in said article of manufacture comprising computer readable program code means for causing a computer to effect the steps of claim 1.

7. A program storage device readable by machine, tangibly embodying a program of instructions executable by the machine to perform method steps for workload control, said method steps comprising the steps of claim 1.

8. A system for workload control, comprising:
at least one processor device configured to control workload of an externally observable computer system, said controlling comprising:
using external performance monitors collecting data by observing only external performance measures of a plurality of requests in a common traffic class directed to the computer system, wherein said external performance measures are: a concurrency measure and a corresponding average response time of the plurality of requests in the common traffic class;
using the collected data to build a black box queuing model of said computer system, said black box queuing model comprising only two resources:
a virtual bottleneck resource; and
a delay resource representing all non-bottleneck resources combined;
operating the black box queuing model with only two parameters related to the common traffic class:
a service time of the requests on a virtual bottleneck resource, and
a delay accounting of the requests on non-bottleneck resources,
wherein the two parameters are evaluated based on historical data collected by the external performance monitors;
using said evaluated two parameters for analyzing said black box queuing model to determine a desirable load capacity of said computer system, said desirable load capacity being the one that drives utilization of the virtual bottleneck resource to a prespecified and desirable target level;
using the desirable load capacity to determine a concurrency limit that drives the utilization of the virtual bottleneck resource based on the computed load capacity; and
employing said desirable load capacity as control parameters for controlling workload of said computer system.

9. The system of claim 8 wherein the at least one processor device is configured to control the workload for the plurality of requests in at least one other traffic class.

10. The system of claim 8 wherein the at least one processor device is configured to control the workload at a predetermined periodic rate.

11. A computer program product comprising a non-transitory computer storage medium having computer readable program code embodied therein for causing workload control, the computer readable program code in said computer program product comprising computer readable program code for causing a computer to effect the functions of claim 9.

* * * * *